(12) United States Patent
Heitner et al.

(10) Patent No.: US 6,750,766 B1
(45) Date of Patent: Jun. 15, 2004

(54) ALERTS MONITOR

(75) Inventors: Ami Heitner, Kfar Saba (IL); Avi Mishan, Holon (IL); Irena Kull, Yehud (IL); Ziv Holzman, Tel-Aviv (IL)

(73) Assignee: SAP Aktiengesellschaft, Walldorf (DE)

( * ) Notice: Subject to any disclaimer, the term of this patent is extended or adjusted under 35 U.S.C. 154(b) by 193 days.

(21) Appl. No.: 10/137,714

(22) Filed: Apr. 30, 2002

Related U.S. Application Data

(60) Provisional application No. 60/355,340, filed on Feb. 6, 2002.

(51) Int. Cl.[7] .............................. G08B 25/00; G06F 7/00
(52) U.S. Cl. .......................... 340/525; 707/102; 705/7; 700/17; 700/83
(58) Field of Search .................... 340/525, 506; 707/1, 7, 9, 10, 102, 104, 200; 705/7; 700/17, 83

(56) References Cited

U.S. PATENT DOCUMENTS 5,710,900 A * 1/1998 Anand et al. ............... 345/764
2002/0099578 A1 * 7/2002 Eicher et al. ................. 705/7
2002/0163427 A1 * 11/2002 Eryurek et al. ............ 340/500

* cited by examiner

*Primary Examiner*—Donnie L. Crosland
(74) *Attorney, Agent, or Firm*—Blakely, Sokoloff, Taylor & Zafman LLP

(57) ABSTRACT

Methods and apparatus, including computer program products, implementing and using techniques for monitoring specific areas of concern in warehouse operations. Information describing operations of a warehouse is stored in a database. Information is displayed on a user interface about an alert type and a category of alert types associated with that alert type, wherein a category of alert types is one of several classes of alert types. A user request for information about an alert type stored in the database is received. The requested information is retrieved from the database, in response to the request and the user interface is updated to display the requested information.

38 Claims, 14 Drawing Sheets

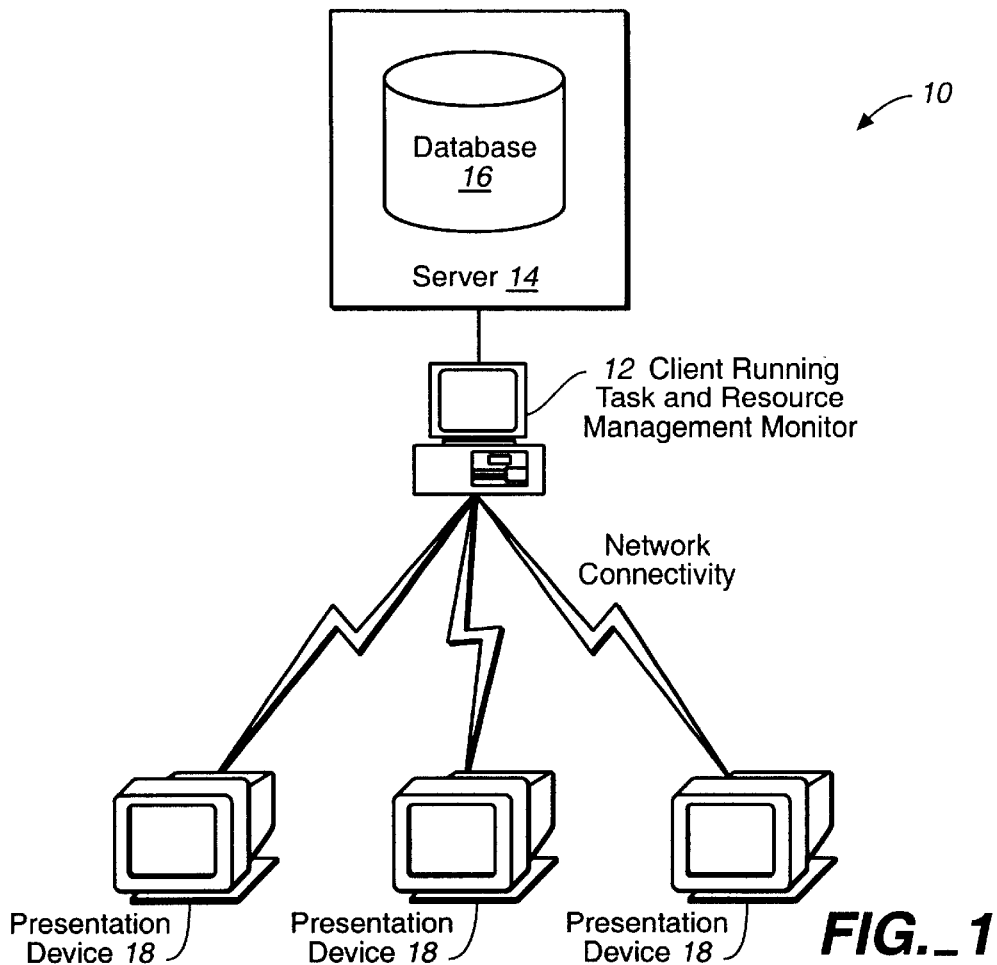
FIG._1
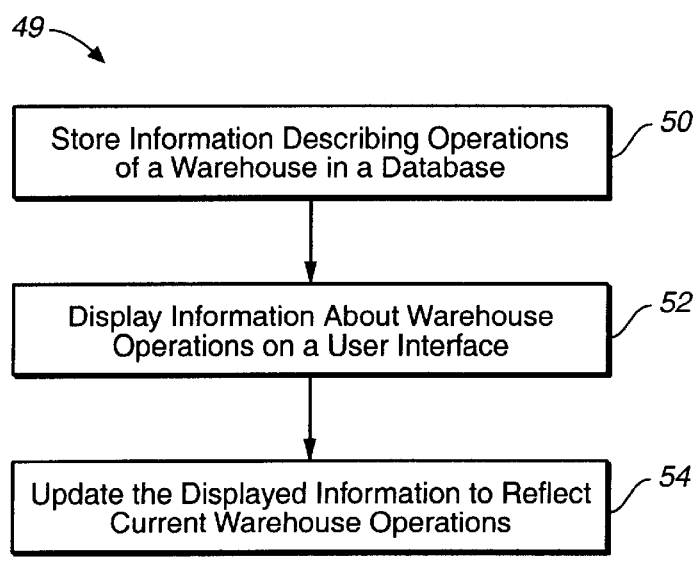
FIG._3

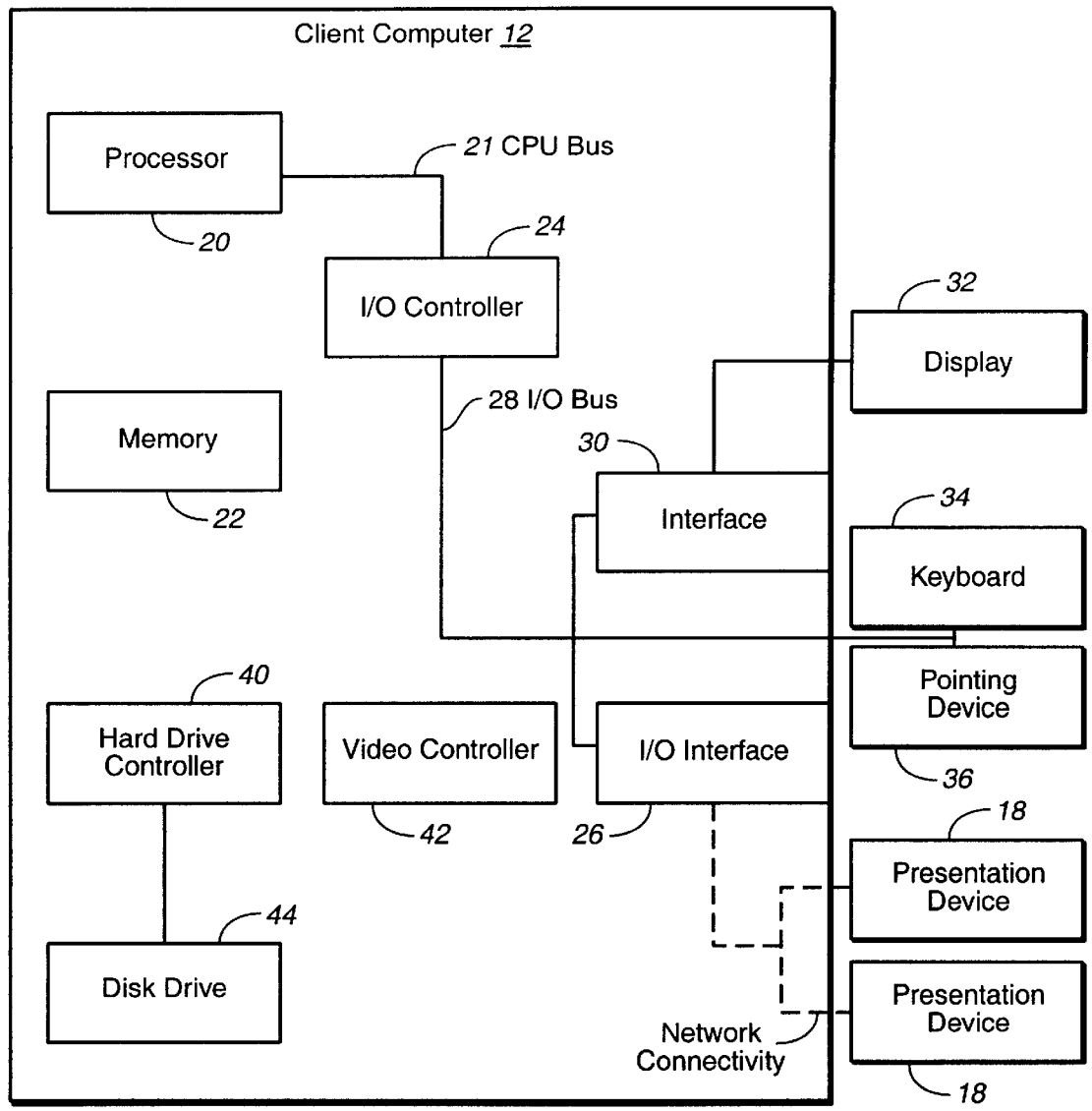
FIG._2

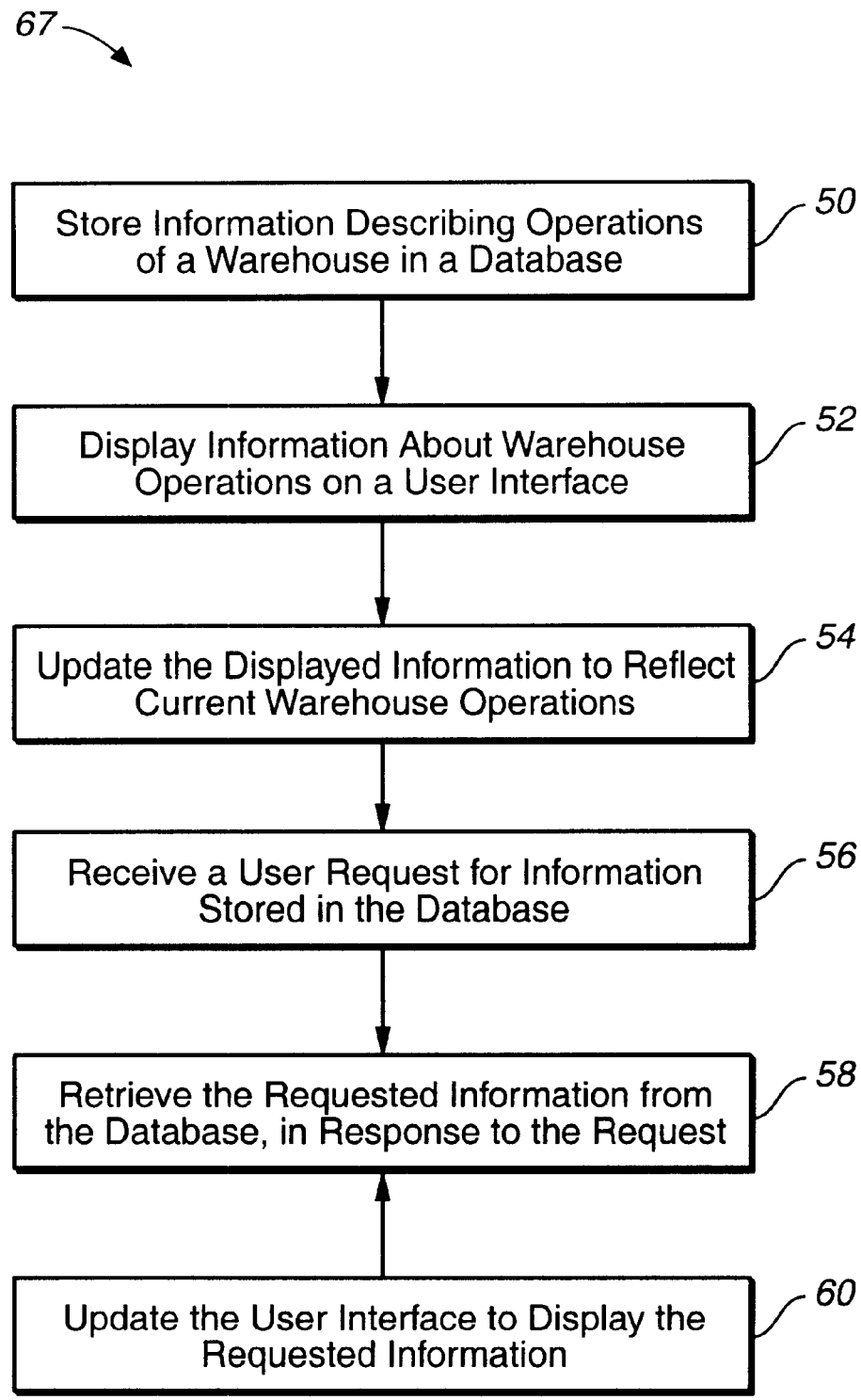
FIG._4

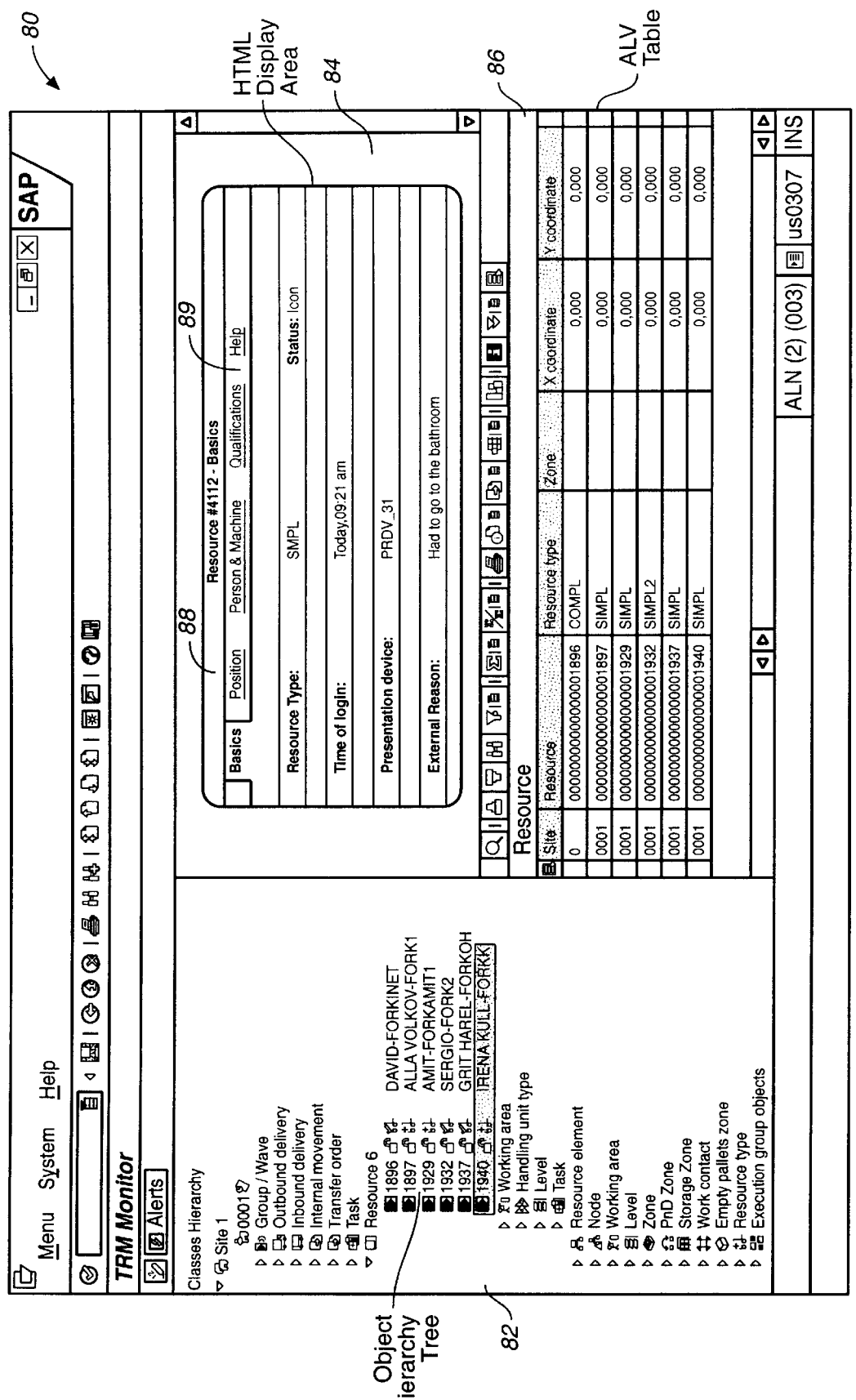
FIG._5

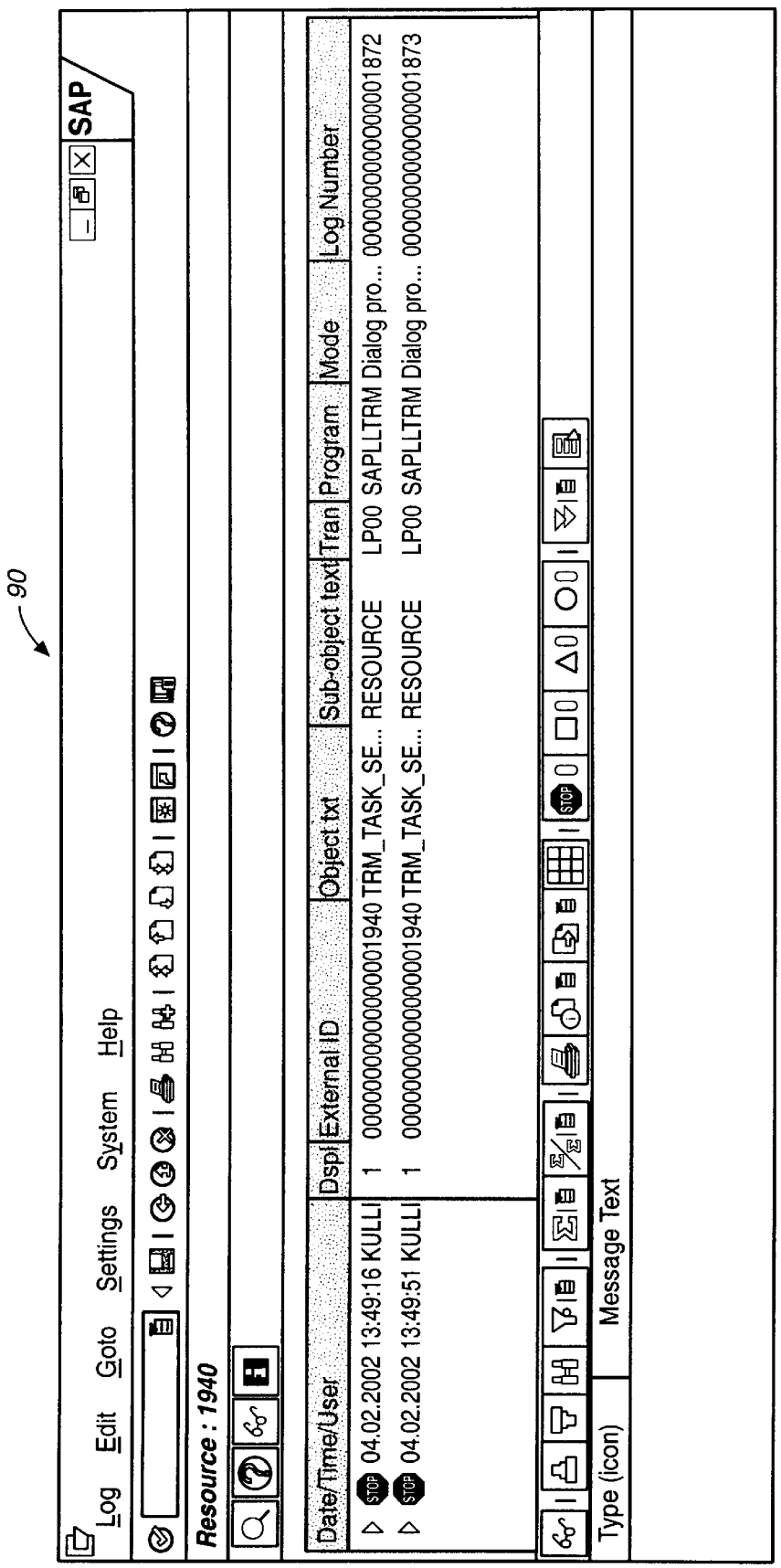
FIG._6

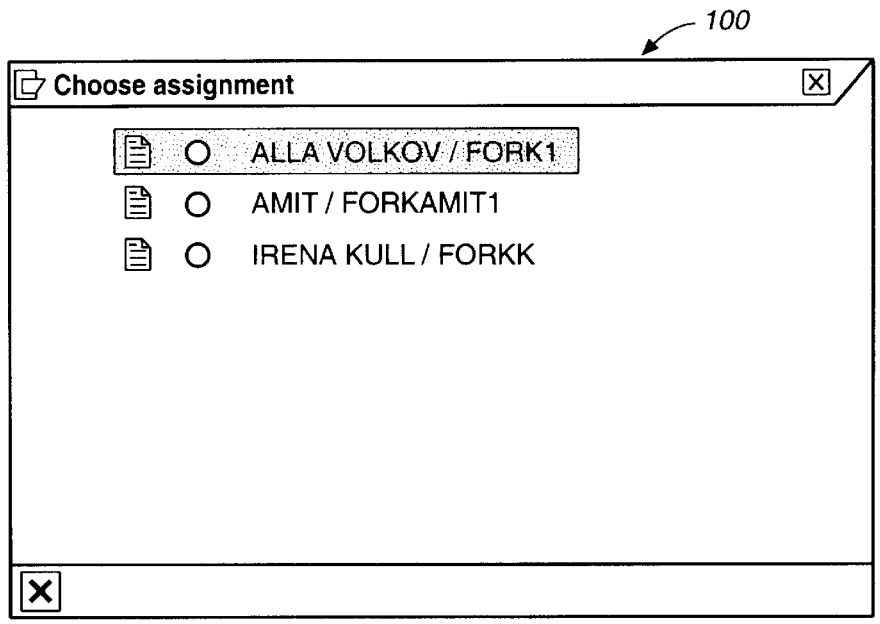
FIG._7
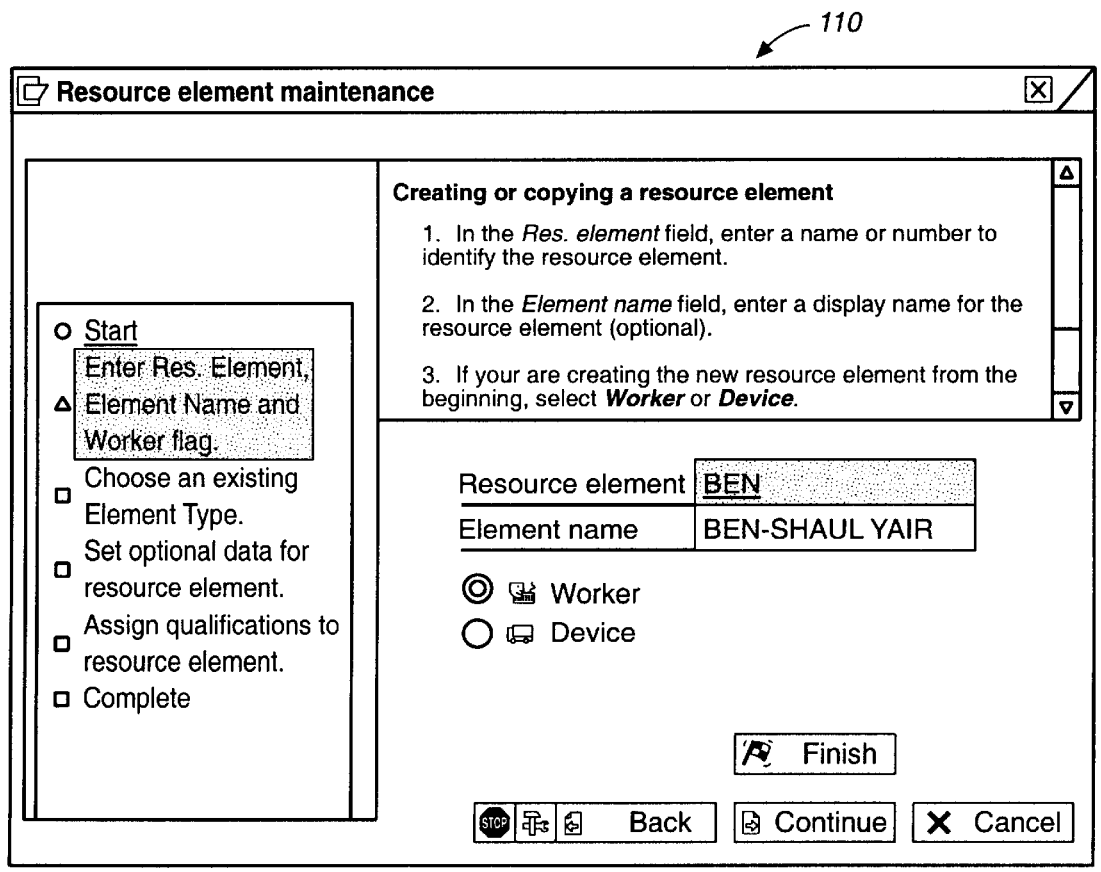
FIG._8

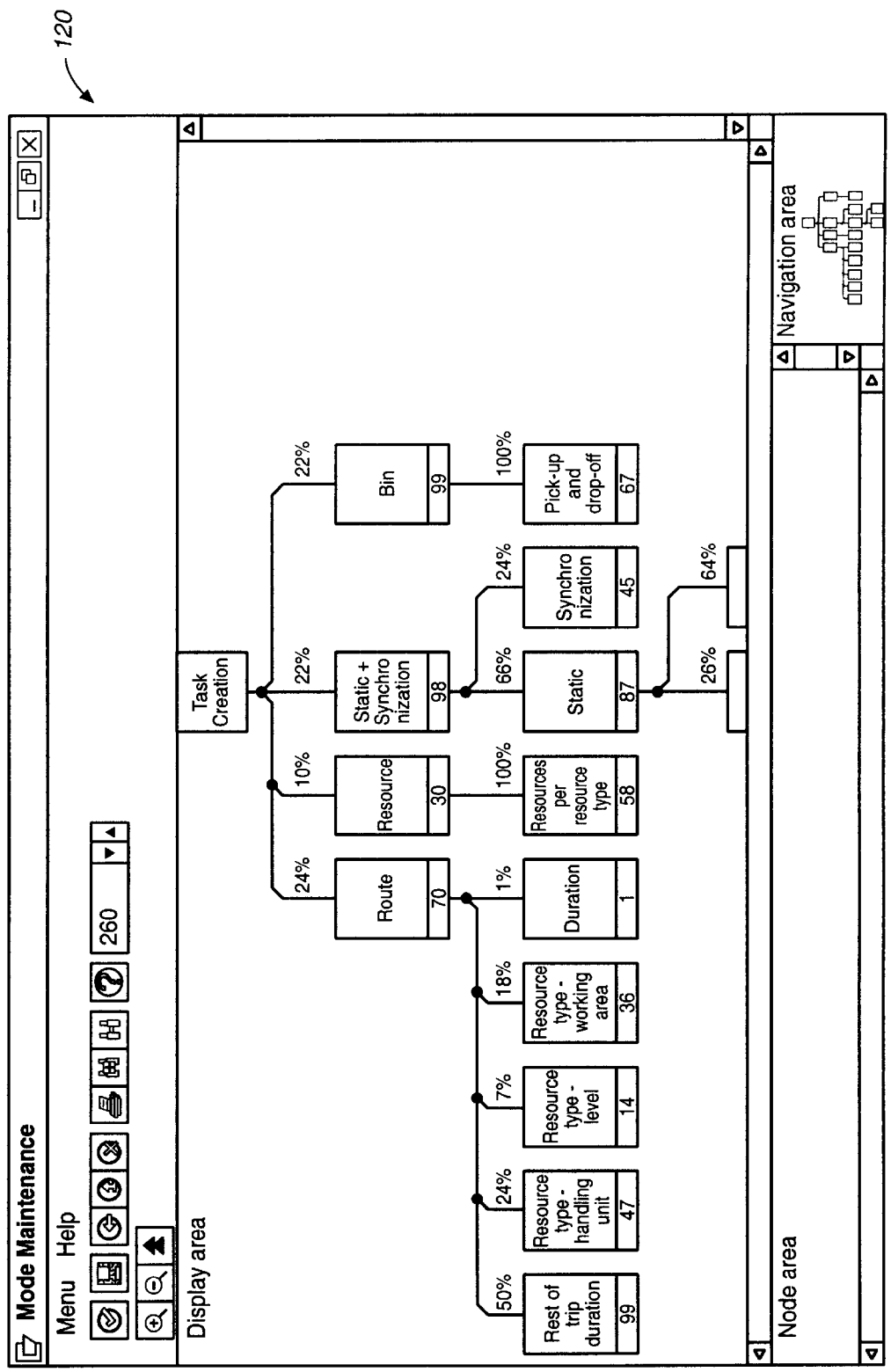
FIG._9

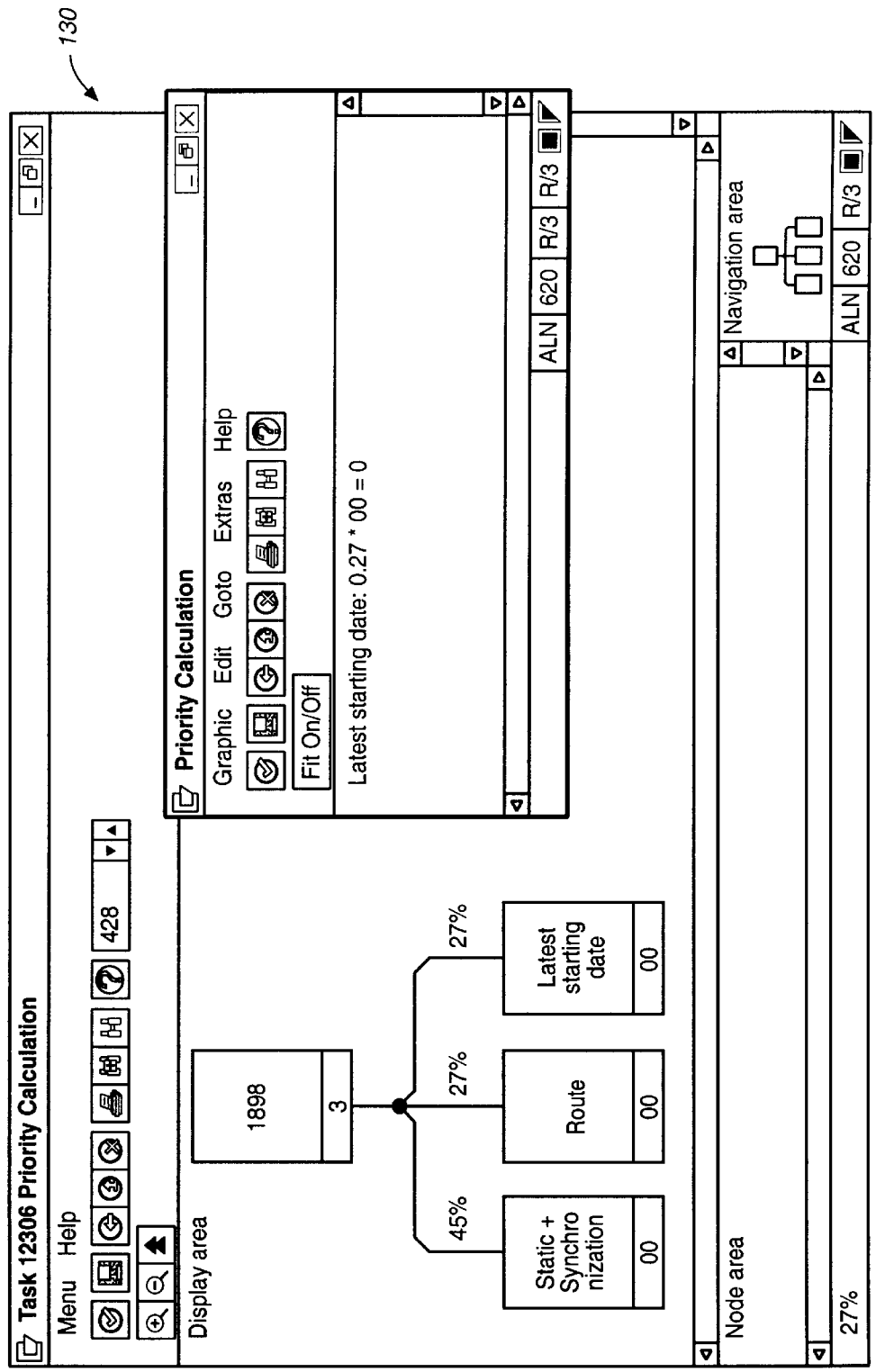
FIG._10

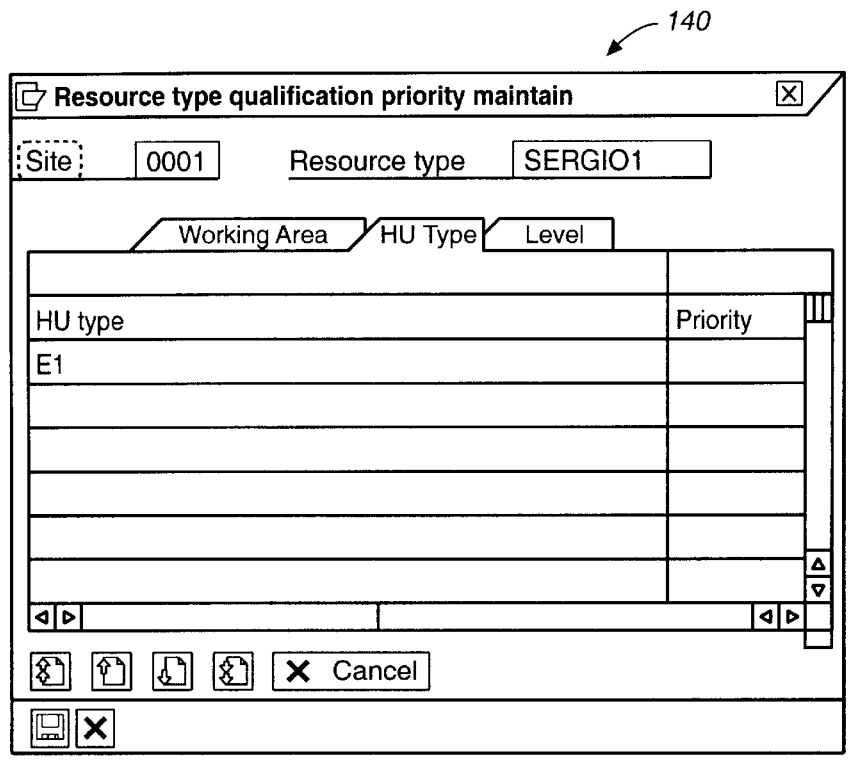
FIG._11
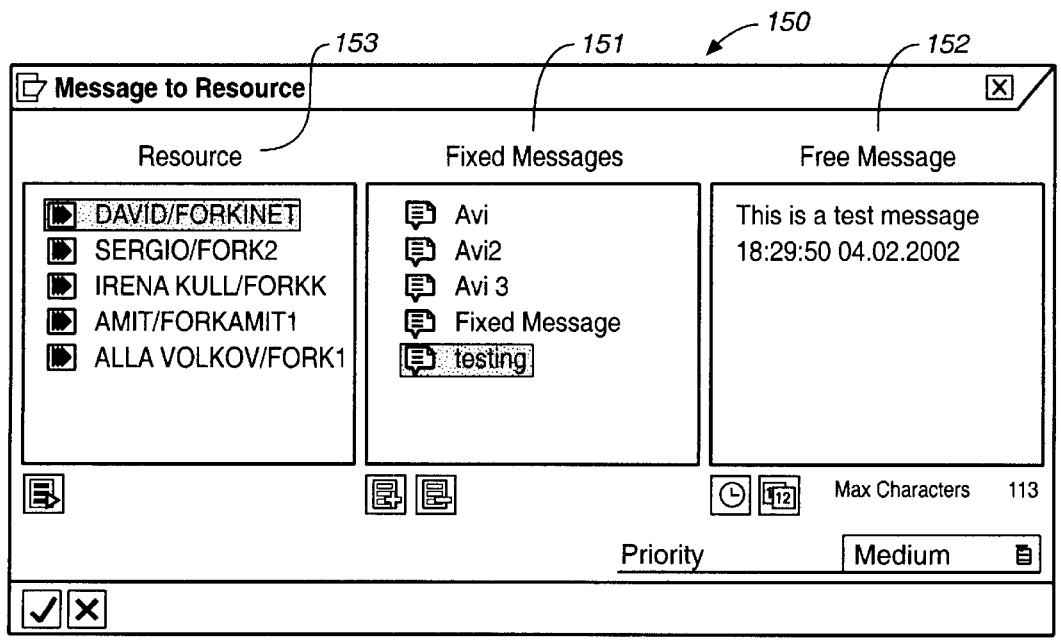
FIG._12

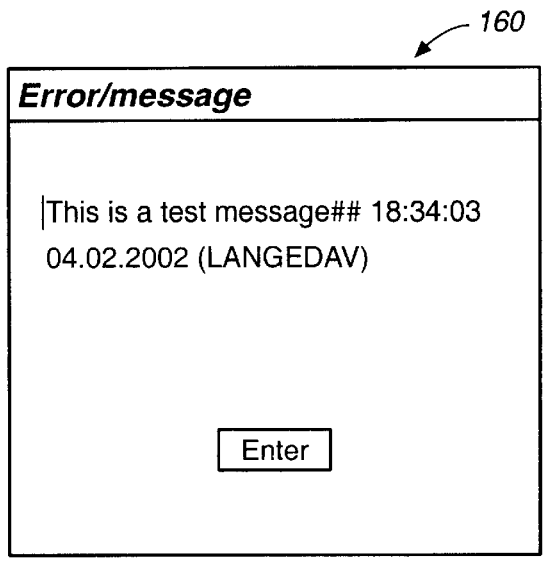
FIG._13
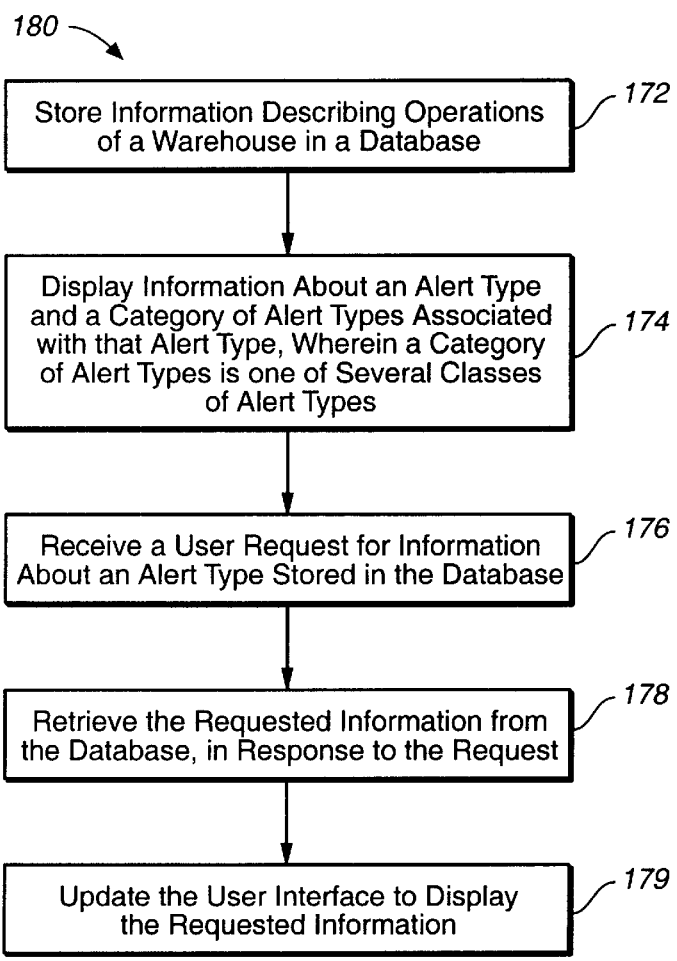
FIG._14

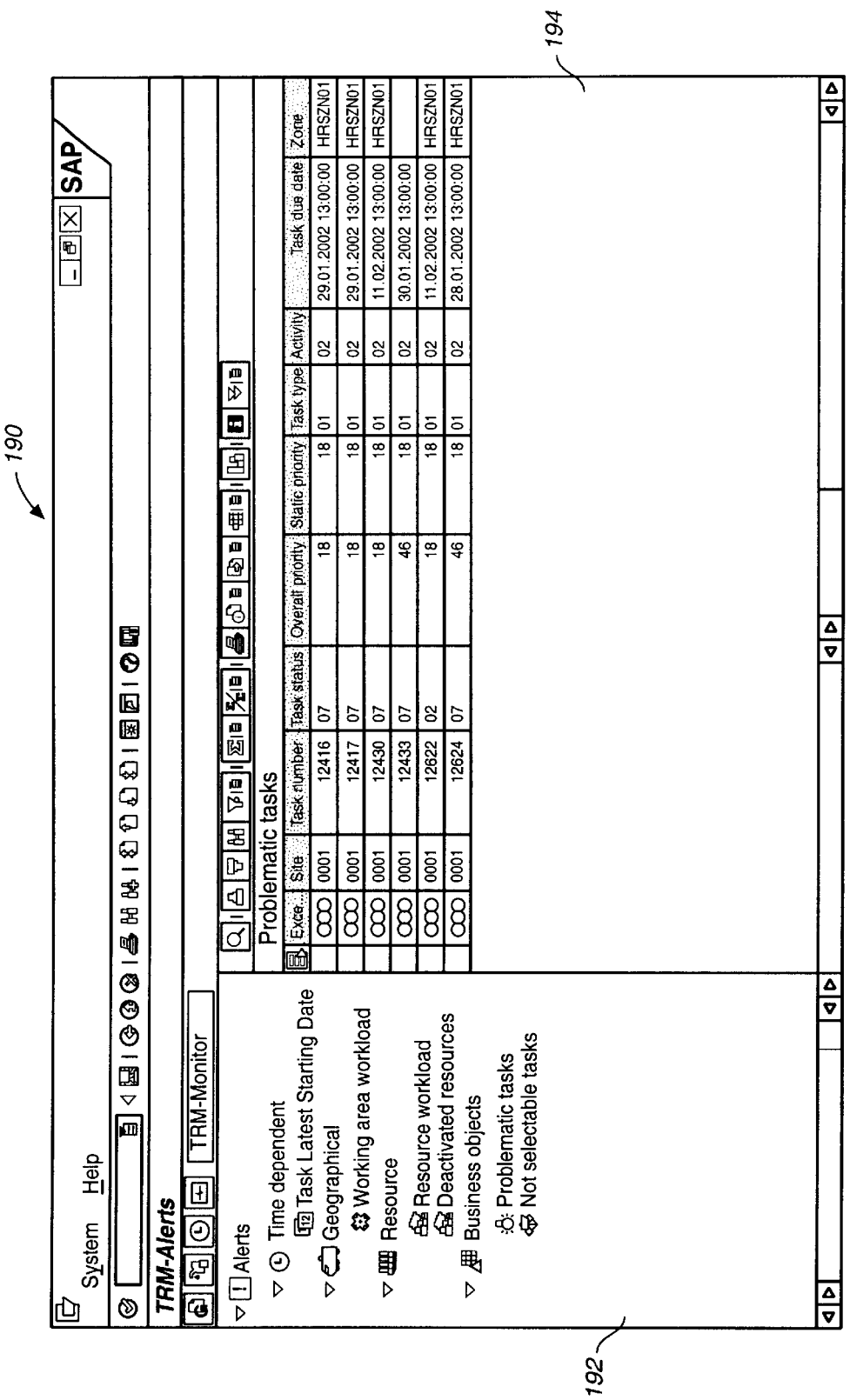
FIG._15

Alerts Maintenance

Site: 0001

| Alert | C | Ta... | Upper Con... | Lower Con... | Uppr Ctrl L... | Lwr Ctrl Level... | Unit type | UOM | Exclude |
|---|---|---|---|---|---|---|---|---|---|
| System | ... | 3 | 25 | 10 | 26 | 12 | AAAADL | PAL | ☐ |
| Resource workload | ... | 3 | 10 | 1 | 6 | 4 | AAAADL | PAL | ☐ |
| Problematic tasks | ... | 2 | 10 | | 60 | | TIME | MIN | ☐ |
| Task Latest Starting Date | ... | 2 | 25 | | 60 | | TIME | MIN | |
| Not selectable tasks | ... | 2 | 25 | | 60 | | TIME | MIN | |

FIG._16

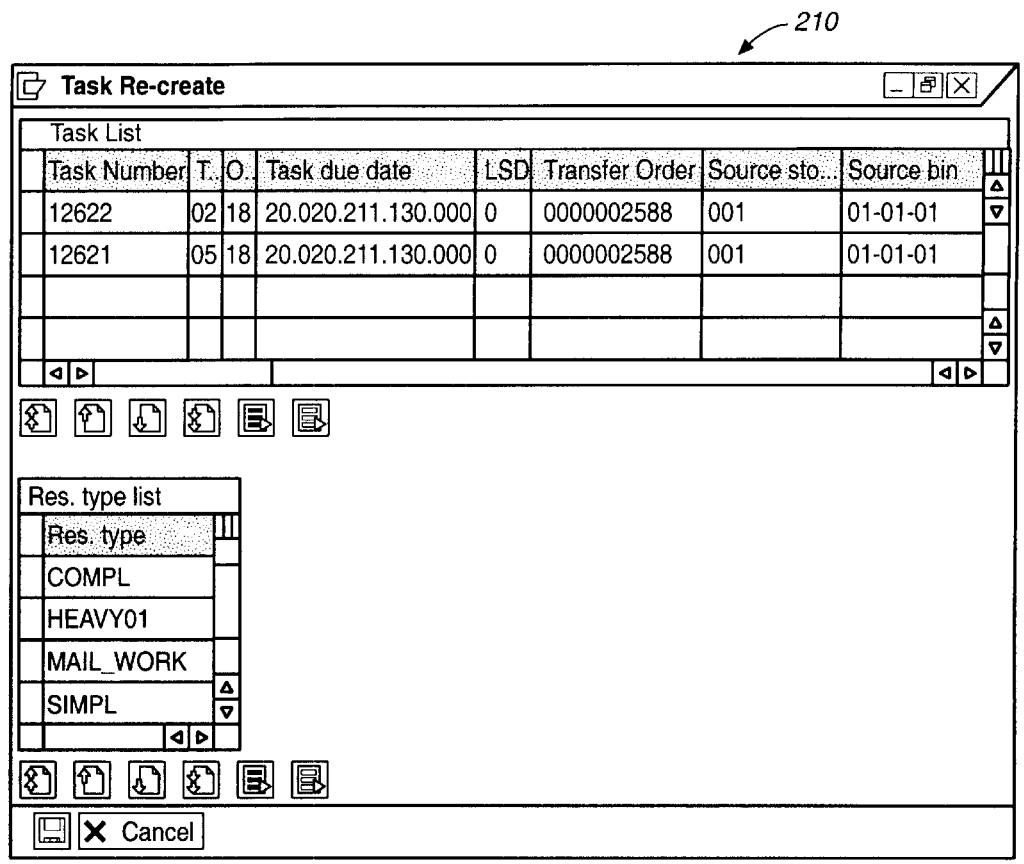
FIG._17
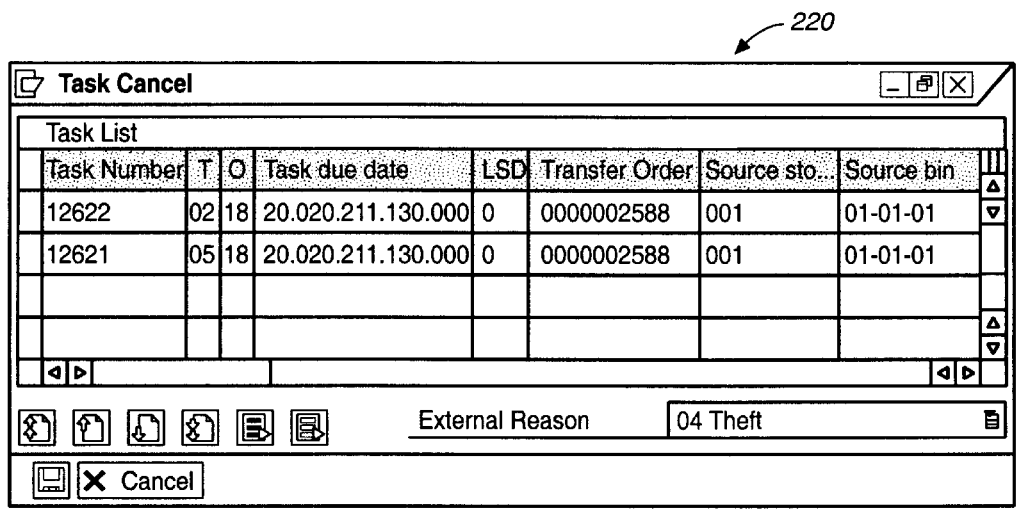
FIG._18

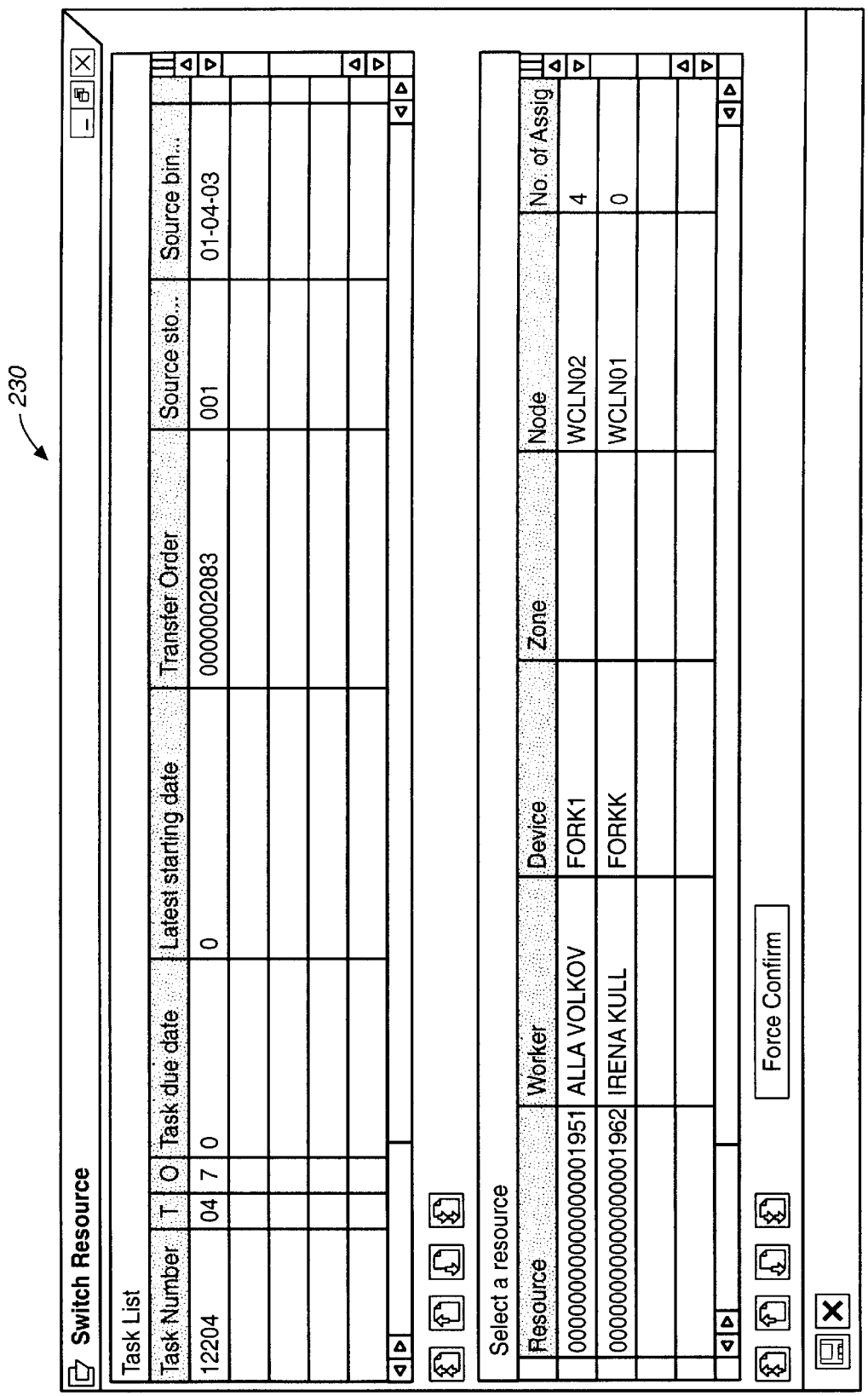
FIG._19

ALERTS MONITOR

RELATED APPLICATIONS

This application is related and claims priority to Provisional Application Serial No. 60/355,340, filed Feb. 6, 2002, of which the entire specification is incorporated herewith by reference. This application is also related to and claims priority to co-pending application Ser. No. 10/136,898 filed Apr. 30, 2002, entitled "Task and Resource Management Monitor", of which the entire specification is incorporated herewith by reference.

BACKGROUND

This application relates to an operations management monitor, and more particularly to methods and systems for monitoring warehouse operations and responding to constantly changing circumstances in the warehouse.

Task and Resource Management (TRM) is a solution developed by SAP AG (SAP) to optimize complex warehouse processes. TRM is a standalone system that can fully be integrated into the Logistics Execution System (LES) or other host management systems. Although, LES and TRM may work together to manage and maintain warehouse operations, each system maintains a separation and has clearly defined responsibilities. LES provides the details about what activity should be performed for which object, while TRM determines how and when the request is executed.

The Request Management, Task Management, Resource Management, Bin Management and Route Management integrated packages comprise the core of TRM. Additionally, the Presentation Management package may be integrated into the TRM. The Request Management package receives requests based on reference documents, such as, transfer orders and delivery documents, from the LES to the TRM. The Task Management package converts the requests into a prioritized list of tasks, which are the elementary physical activities to be performed in a warehouse. Resource Management package manages master and dynamic data related to the resources, which are physical entities with defined qualifications that execute movements and specific operations defined in tasks, in the warehouse. The Bin Management package manages information relating to a site map, which is a detailed three-dimensional layout of the entire warehouse. The Route Management package manages information on the different paths of should use between two points. Finally, the Presentation Management package enables a user to tailor transactions and screen displays for any presentation device.

Among other things, TRM adds business value by increasing efficiency and accelerating supply chain management.

SUMMARY

In general, in one aspect, this invention provides methods and apparatus, including computer program products, implementing and using techniques for monitoring specific areas of concern in warehouse operations. Information describing operations of a warehouse is stored in a database. Information is displayed on a user interface about an alert type and a category of alert types associated with that alert type, wherein a category of alert types is one of several classes of alert types. A user request for information about an alert type stored in the database is received. The requested information is retrieved from the database, in response to the request and the user interface is updated to display the requested information.

Advantageous implementations can include one or more of the following features. The category of alert types can include a category based on one or more of time dependency, warehouse geography, warehouse resources, and business objects. Updating the user interface to display the requested information can include at least one of viewing alert types, displaying details for an alert type, displaying an application log, and displaying a priority model for a task. The user request can be initiated by selecting a category of alert types to reveal the alert types in that category. The user request can be initiated by selecting an alert type to reveal details about the alert type. The user interface can be updated to display the current information by selecting an icon. Switching to a user interface for monitoring warehouse operations can be performed by selecting an icon.

An upper control level can be configured for an alert type, wherein an alert type comprises one of an unconfirmed task whose due date is approaching, a working area workload, a resource workload, the ratio of the number of tasks per suitably qualified resource, and a non-executable task, and an alert can be provided on the user interface when a value of an object for which an alert has been configured has been exceeded.

An upper control level warning can be configured for an alert type, wherein an alert type includes one of an unconfirmed task whose due date is approaching, a working area workload, a resource workload, the ratio of the number of tasks per suitably qualified resource, and a non-executable task, and an alert can be provided on the user interface when a value of an object for which an alert has been configured has been exceeded.

A lower control level can be configured for an alert type, wherein the alert type includes one of an unconfirmed task whose due date is approaching, a working area workload, a resource workload, the ratio of the number of tasks per suitably qualified resource, and a non-executable task, and an alert can be provided on the user interface when a value of an object for which an alert has been configured falls below the lower control level. A lower control level warning for an alert type can be configured, wherein an alert type comprises one of an unconfirmed task whose due date is approaching, a working area workload, a resource workload, the ratio of the number of tasks per suitably qualified resource, and a non-executable task; and an alert can be provided on the user interface when a value of an object for which an alert has been configured falls below the lower control level warning.

A user request to modify information stored in the database can be received. The information in the database can be modified in response to the request, and the user interface can be updated to display the modified information. Modifying the information can include changing the priority of a task, refreshing the alerts monitor display, releasing a force skipped task back into the pool of available tasks, executing final confirmation of a force confirmed task, confirming a force skipped task with zero quality, and canceling a force skipped task and creating a replacement task.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 1 illustrates a system that includes an operations management monitor, according to an implementation of the invention.

FIG. 2 illustrates a client computer, according to an implementation of the invention.

FIG. 3 illustrates the flow of monitoring warehouse operations, according to an implementation of the invention.

FIG. 4 illustrates the flow of a user request for information while monitoring warehouse operations, according to an implementation of the invention.

FIG. 5 is a screenprint showing the structure of an operations management monitor, according to an implementation of the invention.

FIG. 6 is a screenprint showing the structure of an operations management monitor while executing the Application Log Display monitor method, according to an implementation of the invention.

FIG. 7 is a screenprint showing the structure of an operations management monitor while executing the Assign/Unassign monitor method, according to an implementation of the invention.

FIG. 8 is a screenprint showing the structure of an operations management monitor while executing the Create/Copy/Modify/Delete Resource Element monitor method, according to an implementation of the invention.

FIG. 9 is a screenprint showing the structure of an operations management monitor while executing the Mode Maintenance monitor method, according to an implementation of the invention.

FIG. 10 is a screenprint showing the structure of an operations management monitor while executing the Priority Explain monitor method, according to an implementation of the invention.

FIG. 11 is a screenprint showing the structure of an operations management monitor while executing the Priority Maintain monitor method, according to an implementation of the invention.

FIG. 12 is a screenprint showing the structure of an operations management monitor while executing the Sending Messages to Resources monitor method, according to an implementation of the invention.

FIG. 13 is a screenprint showing the structure of a message received on a presentation device from an operations management monitor, according to an implementation of the invention.

FIG. 14 illustrates the flow of a user request for information while monitoring alerts, according to an implementation of the invention.

FIG. 15 is a screenprint showing the structure of an alerts monitor, according to an implementation of the invention.

FIG. 16 is a screenprint showing the structure of an alerts monitor while configuring alerts, according to an implementation of the invention.

FIG. 17 is a screenprint showing the structure of an alerts monitor while executing the Recreate alerts monitor method, according to an implementation of the invention.

FIG. 18 is a screenprint showing the structure of an alerts monitor while executing the Cancel alerts monitor method, according to an implementation of the invention.

FIG. 19 is a screenprint showing the structure of an alerts monitor while executing the Switch alerts monitor method, according to an implementation of the invention.

Like reference symbols in the various drawings indicate like elements.

DETAILED DESCRIPTION

As shown in FIG. 1, a system 10 including an operations management monitor comprises a client computer 12 executing software for monitoring warehouse operations coupled to a server 14 that includes a database 16. The client computer may also be coupled to a presentation device 18 using a network connection. The communication link between the client computer and the presentation device may be a serial link, parallel link, local area network, or wireless link (e.g., a RF communication link.)

As shown in FIG. 2, a client computer may include a processor 20, memory coupled to the processor 22, a hard drive controller 40, a video controller 42, and an input/output (I/O) controller 24 coupled to the processor by a processor (CPU) bus 21. The hard drive controller 40 is coupled to a hard disk drive 44 suitable for storing executable computer programs, including programs embodying the present technique. The I/O controller is coupled by means of an I/O bus 28 to an I/O interface 26. The I/O interface receives and transmits data in analog or digital form over at least one of the communication links mentioned above. A display 32 is coupled to an interface 30, which is coupled to an I/O bus 28. A keyboard 34 and pointing device 36 are also coupled to the I/O bus. Alternatively, separate buses can be used for the keyboard, pointing device and I/O interface.

The steps 49 for monitoring warehouse operations are recited below with reference to FIGS. 1–3. These steps may be implemented in the system of FIG. 1. Database 16 included in server 14 stores information describing operations of a warehouse 50. Alternatively, the hard disk drive 44 of the client computer 12 may include the database that stores 50 information describing the operations of a warehouse. Information about warehouse operations may be displayed 52 on a user interface on the display 32 of the client computer 12. The information displayed on the user interface on the display of the client computer is updated 54 to reflect current warehouse operations. As shown in FIG. 4, a warehouse employee with access to the keyboard 34 or pointing device 36 of the client computer may use the user interface to request 56 information stored in the database. The client computer communicates with the server and retrieves 58 the requested information from the database, in response to the user request. The user interface is updated 60 to display the requested information. Displaying information about warehouse operations 52 may include presenting information relating to a transfer order, delivery document, task, resource and area within the warehouse. More specifically, the information may include information about an unloading point, Incoterms, delivery date of an item, staging area, planned execution, number of line items of internal movements and transfer orders, status of a task, priority of a task, source of a task, destination of a task, due date of a task, status of a resource and the resource's associated elements, qualifications of a resource and the resource's associated elements, starting point of a resource and the resource's associated elements, current location of a resource and the resource's associated elements, presentation device of a resource and the resource's associated elements.

According to an embodiment of the invention, the present technique implements a software package, the TRM Monitor, which may be integrated with the core TRM packages mentioned earlier. The TRM Monitor provides an operations management monitor. The TRM Monitor is a tool that keeps warehouse managers constantly up-to-date as to the current situation in the warehouse. The TRM Monitor also enables managers to initiate appropriate responses in light of that situation.

The TRM Monitor may be used to display current information on LES and TRM objects, including transfer orders, tasks (required elementary physical operations or movements to fulfill host requests), resources (physical entities with defined qualifications that execute movements and specific operations defined in tasks (e.g., a standalone worker or one worker with one device)), zones (groupings of either storage bins, work centers, pick-up and drop-off points, and empty pallet zones used for resource navigation purposes), and execution group objects (EGOs) (physical geographical objects on which constraints are placed.) The TRM Monitor may also be used to track all activities performed in the warehouse. The TRM Monitor user interface allows a user to select an LES reference document and "drill-down" to the activity level to ascertain its status. Additionally, the TRM Monitor may initiate managerial responses to warehouse circumstances. The warehouse supervisor may use the TRM Monitor methods to perform actions on a selected object class or object. Finally, the TRM Monitor may access the Alerts Monitor.

As shown in FIG. 5, the TRM Monitor user interface 80 comprises three areas: a hierarchy tree 82, a HTML display area 84, and an ALV table 86. In one embodiment, the object hierarchy tree 82, located on the left side of the monitor, is a navigation area consisting of the various object classes, associated objects and their statuses. The hierarchy tree may be used to display the object classes and objects. The HTML display area 84, located on the top right side of the monitor, displays an HTML page with key object data when the Display method is invoked for an object. This area is not synchronized with the other areas of the monitor. The HTML data remaining unchanged until the Display method is once again invoked. The ALV table 86, located on the bottom right side of the monitor, contains all fields of the object records and can display records of all retrieved objects simultaneously. This area is synchronized with the object hierarchy tree.

By using the TRM Monitor's "drag and relate" function, a user can "drill-down" from higher-level to lower-level information using the hierarchy tree by selecting a criteria object and dragging it to a destination object class. This "drag and relate" function by the user initiates a request, which results in the destination object class node expanding, revealing its objects and sub-classes.

In FIG. 5, the user selected "site 001," and dragged it down to the object class "Resource." The object class Resource expanded, displaying all resources (objects) in site 001. This function is effective for tracking the workflow in the warehouse. For example, you can find out the status of tasks resulting from a particular transfer order by dragging the "Transfer Order" object on to the object class "Tasks." The resultant tasks appear.

By double-clicking the icon of an object in the hierarchy tree, the user initiates a request for information. In response to the request, the object's details appear in the HTML display area. As shown in FIG. 5, when a user double-clicked a resource, its basic details appeared in the HTML area, including the resource type, status and time of login. The user may view other details such as Position 88 and Qualifications 89 of the resources by clicking on the appropriate link.

In addition to the steps of FIG. 3, a warehouse employee with access to the keyboards 34 or pointing device 36 of the client computer may use the user interface to request modification of information stored in the database. The client computer communicates with the server and modifies the information stored in the database. The user interface is updated to display the requested information. The TRM Monitor's methods represent various actions that warehouse managers (or other users) can invoke using the monitor. Each method belongs to either the display methods or the maintenance methods category. You invoke the methods by right-clicking the icon next to the relevant object or object class in the hierarchy tree. A pop-up menu appears, displaying the available methods for the selected object class. As shown in FIG. 6, the Application Log Display method displays the application log 90 relating to the selected object. The Display method, which may be performed on all object types, displays details for an object in the HTML display area. The Refresh method, which may be performed on all object types, refreshes the monitor display. The Fix Navigators monitor method, which may be performed on all object types, sets a node (a linked functional location through which resources may pass or where goods are placed) as the point of reference. The Fix Navigators method may be used instead of the "drag-and-drop" mechanism. The Set Off Fixed Navigators method, which may be performed on all object types, discontinues the use of a node as a point of reference. The Hide Selected Objects method, which may be performed on all object classes and all object types, hides one or more selected objects in both the Hierarchy Tree and the ALV Table. The Hide Unselected Objects methods, which may be performed on all object classes and all object types, hides one or more unselected objects in both the Hierarchy Tree and ALV table.

The Block method, which may be performed on an object that is a resource type, resource element or a node, blocks an object and prevents it from being used. The Unblock method, which may be performed on an object that is a resource type, resource element, node or a bin, unblocks a previously blocked object. The Manual Scheduling method dispatches either all dispatchable requests pertaining to a site when performed on a site or a request pertaining to a particular transfer order when performed on a transfer order. As shown in FIG. 7, the Assign method, which may be performed on an object that is a task or a replenishment, enables the user to manually assign a task to a selected resource. In this example 100, a task may be assigned to one of the three available resources: Alla Volkov and forklift ForkI, Amit and forklift Forkamit1 or Irena Kull and forklift Forkk. The corresponding Unassign method, which also may be performed on a task or a replenishment, enables a user to unassign a task from a selected resource. As shown in FIG. 8, the Create/Copy/Modify/Delete methods, which may be performed on a resource element, enables a user to create, copy, modify, and delete, respectively, a new resource element. Selecting one of these methods opens the Resource Element Maintenance Wizard 110, enabling you to perform these commands. The Enable/Disable methods enable or disable Execution Group Objects (zones in the warehouse on which capacity constraints have been placed).

The Logoff monitor method, which may be performed on a resource, logs off a resource from the system. As shown in FIG. 9, the Mode Maintenance method 120 enables you to affect task prioritization at the task creation and selection stages by creating, modifying and deleting modes (operating states that represent a set of warehouse circumstances, such as, a shift or season), or enter or modify weighting factors for each of the priority entities. Mode Maintenance may be performed on an object of the type site. As shown in FIG. 10, the Priority Explain method, which opens the priority explanation tool 130 displays the priority model for a selected task (including the normalized weights and priorities for the various priority entities, at both task creation and task selection stages) and enables you to view priority calculations. As shown in FIG. 11, the Priority Maintain method 140 enables a user to assign a priority to the working area (defined for administrative purposes to restrict the work of resources to specific areas in the site), HU type and level resource types. These priorities are part of the total route priority and ultimately affect the final priority of a task.

The Sending Messages to Resources monitor method 150 enables a user to send messages to the presentation devices of selected resources. This method is accomplished by one of a serial communication link, local area network, wireless network and parallel link. As shown in FIG. 12, a fixed 151 or a free 152 message may be sent to the presentation device of any one the five resources 153 listed. As shown in FIG. 13, the sent message 160 appears on the presentation device of the resource as shown. A warehouse supervisor can use this method to transmit the task list for each resource. Additionally, a user may access additional Alerts Monitor functions by selecting the Alerts option in the TRM Monitor. By using the above-mentioned functions of the TRM Monitor, a manager or supervisor of a warehouse may be able to monitor all facets of warehouse operations and take actions appropriates for a specific situation more efficiently than was possible before and may, by using TRM Monitor as an integrated package of TRM, therefore help achieve TRM's goal of optimizing complex warehouse processes.

The Alerts Monitor is a tool for highlighting actual and emerging problematic situations in the warehouse and enabling responses to be initiated (exception handling). The Alerts Monitor provides information on error critical situations such as workload bottlenecks and approaching due date violations. Referring to FIGS. 1, 2 and 14, the steps 180 for monitoring these specific areas of concern in warehouse operations are recited. These steps may be implemented in the system of FIG. 1. Database 16 included in server 14 stores 172 information describing operations of a warehouse. Alternatively, the hard disk drive 44 of the client computer 12 may include the database that stores 172 information describing the operations of a warehouse. Information about an alert type and a category of alert types associated with that alert type, wherein a category of alert types is one-of several classes of alert types, may be displayed 174 on a user interface on the display 32 of the client computer 12. A warehouse employee with access to the keyboard 34 or pointing device 36 of the client computer may use the user interface to request 176 information about an alert type stored in the database. The client computer communicates with the server and retrieves 178 the requested information from the database, in response to the user request. The user interface is updated 179 to display the requested information, which may include viewing alert types, displaying details for an alert type, displaying an application log, and displaying a priority model for a task. The category of alert types mentioned above may include a category based upon time dependency, warehouse geography, warehouse resources, and business objects.

As shown in FIG. 15, the Alerts Monitor 190 consists of a hierarchy tree 192 and ALV grid 194. The hierarchy tree contains the various object classes, in this case the categories of alert types. By clicking, using pointing device 36, on the expand arrow alongside an object class, the user initiates a request for information. In response to this request, the node expands to reveal the sub-object classes, in this case the alert types. The user does not perform the "drag and relate" function, as was the case with the TRM Monitor.

By double-clicking on the icon a sub-object class (the alert types) the user initiates a request. In response to the request the user interface displays all object records in the ALV table, with each object having its own "traffic light" to indicate the severity of the alert. Hence, the details of the alert types are displayed. As shown in FIG. 15, a user double-clicked Problematic Tasks to reveal all relevant tasks records in the ALV table.

A user can update the Alerts Monitor by selecting the Refresh icon located at the top of the Alerts Monitor. A user may also set a period of time after which the Alerts Monitor updates automatically. After finished with the Alerts Monitor functions, a user may switch to the TRM monitor by selecting the Back icon located at the top of the alerts monitor.

In addition to the steps of FIG. 14, a warehouse employee with access to the keyboard 34 or pointing device 36 of the client computer may use the user interface to configure an upper control level or an upper control level warning for an alert type, wherein an alert type may include one of an unconfirmed task whose due date is approaching, a working area workload, a resource workload, the ratio of the number of tasks per suitably qualified resource, and a non-executable task, and to provide an alert on the user interface when a value of an object for which an alert has been configured has been exceeded. A warehouse employee with access to the keyboard 34 or pointing device 36 of the client computer may also use the user interface to configure an lower control level or an lower control level warning for an alert type, wherein an alert type may include one of an unconfirmed task whose due date is approaching, a working area workload, a resource workload, the ratio of the number of tasks per suitably qualified resource, and a non-executable task, and to provide an alert on the user interface when a value of an object for which an alert has been configured falls below the lower control level.

The Alerts Monitor provides for different levels of alerts for exception situations. In order for a user to receive alerts, the alerts must be configured. A user can configure alerts by right-clicking an object class or clicking the Configure icon above the hierarchy tree. As shown in FIG. 16, you can set the upper 201, 202 and lower levels 203, 204 for triggering alerts and decide which alerts to exclude 205 from the alerts monitor. Alerts are triggered, resulting in the display of an orange traffic light in the Exceptions field of FIG. 15, when the value of an object either exceeds the upper control level warning or falls below the lower control level warning. Alerts are also triggered, resulting in the display of a red traffic light in the Exceptions field of FIG. 15, when the value of an object either exceeds the upper control level or falls below the lower control level. A green traffic light appears in the Exceptions field of FIG. 15 after a user has dealt with the problem via the alert monitor methods described below.

The Alerts Monitor provides alerts for the Task Latest Starting Date exception situation, which is in the Time Dependent exception situation category. This exception situation notifies a user of an unconfirmed task whose due date is approaching. Additionally, the Alerts Monitor provides alerts for the Working Area Workload exception situation, which is in the Geographical exception situation category. This exception situation notifies a user when the workload of a working area in the warehouse is too high or too low. The Alerts Monitor also provides alerts for the Resource Workload exception situation, which is in the Resource exception situation category. This exception situation notifies a user when the workload of a warehouse resource is too high or too low. Finally, the Alerts Monitor provides alerts for the Problematic Tasks exception situation, which is in the Business Objects exception situation category. This exception situation notifies a user of working areas where the ratio of the number of tasks per suitably qualified resource is high. Examples of other available alerts are Non-Selectable Tasks, Non-Executable Tasks and Deactivated Resources.

In addition to the steps of FIG. 14, a warehouse employee with access to the keyboard 34 or pointing device 36 of the client computer may use the user interface to request modification of information stored in the database. The client computer communicates with the server and modifies the information stored in the database, in response to the request. The user interface is updated to display the requested information. The different alerts/object classes have their own exception handling methods. A user may invoke the methods and perform actions on an object by selecting a specific object in the ALV table, clicking the methods icon located above the ALV table, and selecting a method from the pop-up menu. The Display alerts monitor method displays details for an object in a pop-up window. The Application Log Display alerts monitor method displays the application log for the selected object. The Change Priority alerts monitor method enables a user to change the priority of a task. The Refresh alerts monitor method refreshes the Alerts Monitor display to present updated information. The Priority Explain alerts monitor method opens the Priority Explanation tool, which displays the priority model for a selected task. The priority model is defined as a group of entities that affect the final importance of priority of a task, the extent of their impact being determined by the entities' weightings and values. The Release alerts monitor method releases a force skipped task back into the pool of available tasks. The Complete Confirm alerts monitor method executes final confirmation of a force confirmed task.

As shown in FIG. 17, the Recreate alerts monitor method 210 cancels a force skipped task and creates a replacement task for your selected resource type. As shown in FIG. 18, the Cancel alerts monitor method 220 confirms a force skipped task with zero quantity. As shown in FIG. 19, the Switch alerts monitor method 230 enables a user to switch assigned tasks from a deactivated or non-functional resource to another resource.

By monitoring specific areas of concern in the warehouse, such as, workload bottlenecks and approaching due date violations, the Alerts Monitor provides information on actual and arising problematic situations in the warehouse and gives warehouse supervisors the opportunity to take appropriate action to handle exceptions.

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

Other embodiments are within the scope of the following claims.

What is claimed is:

1. A method for monitoring specific areas of concern in warehouse operations comprising:
    storing information describing operations of a warehouse in a database;
    displaying information on a user interface about an alert type and a category of alert types associated with that alert type, wherein a category of alert types is one of several classes of alert types;
    receiving a user request for information about an alert type stored in the database;
    retrieving the requested information from the database, in response to the request; and
    updating the user interface to display the requested information.

2. The method of claim 1 wherein the category of alert types includes one of: a category based on time dependency, a category based on warehouse geography, a category based on warehouse resources, and a category based on business objects.

3. The method of claim 2 wherein updating the user interface to display the requested information includes at least one of viewing alert types, displaying details for an alert type, displaying an application log, and displaying a priority model for a task.

4. The method of claim 2 wherein the user request is initiated by selecting a category of alert types to reveal the alert types in that category.

5. The method of claim 2 wherein the user request is initiated by selecting an alert type to reveal details about the alert type.

6. The method of claim 2 further comprising updating the user interface to display the current information by selecting an icon.

7. The method of claim 2 further comprising switching to a user interface for monitoring warehouse operations by selecting an icon.

8. The method of claim 1 further comprising:
    configuring an upper control level for an alert type, wherein an alert type comprises one of an unconfirmed task whose due date is approaching, a working area workload, a resource workload, the ratio of the number of tasks per suitably qualified resource, and a non-executable task; and providing an alert on the user interface when a value of an object for which an alert has been configured has been exceeded.

9. The method of claim 1 further comprising:

configuring an upper control level warning for an alert type, wherein an alert type comprises one of an unconfirmed task whose due date is approaching, a working area workload, a resource workload, the ratio of the number of tasks per suitably qualified resource, and a non-executable task; and providing an alert on the user interface when a value of an object for which an alert has been configured has been exceeded.

10. The method of claim 1 further comprising:

configuring a lower control level for an alert type, wherein an alert type comprises one of an unconfirmed task whose due date is approaching, a working area workload, a resource workload, the ratio of the number of tasks per suitably qualified resource, and a non-executable task; and providing an alert on the user interface when a value of an object for which an alert has been configured falls below the lower control level.

11. The method of claim 1 further comprising:

configuring a lower control level warning for an alert type, wherein an alert type comprises one of an unconfirmed task whose due date is approaching, a working area workload, a resource workload, the ratio of the number of tasks per suitably qualified resource, and a non-executable task; and providing an alert on the user interface when a value of an object for which an alert has been configured falls below the lower control level warning.

12. The method of claim 2 further comprising:

receiving a user request to modify information stored in the database;

modifying the information in the database, in response to the request; and updating the user interface to display the modified information.

13. The method of claim 12 wherein modifying the information comprises changing the priority of a task, refreshing the alerts monitor display, releasing a force skipped task back into the pool of available tasks, executing final confirmation of a force confirmed task, confirming a force skipped task with zero quality, and canceling a force skipped task and creating a replacement task.

14. A system for monitoring specific areas of concern in warehouse operations comprising:

a server for storing a database;

a client device for monitoring specific areas of concern in warehouse operations comprising:

a processor;

a memory coupled to the processor to store instructions that, when applied to the processor, cause the processor to:

store information describing operations of a warehouse in a database;

display information on a user interface about an alert type and a category of alert types associated with that alert type, wherein a category of alert types is one of several classes of alert types;

receive a user request for information about an alert type stored in the database;

retrieve the requested information from the database, in response to the request; and update the user interface to display the requested information; and a communication link between the client and the server.

15. The system of claim 14 wherein the memory further includes instructions to cause the processor to update the user interface to display the current information by selecting an icon.

16. The system of claim 14 wherein the memory further includes instructions to cause the processor to switch to a user interface for monitoring warehouse operations by selecting an icon.

17. The system of claim 14 wherein the memory further includes instructions to cause the processor to:

configure an upper control level for an alert type, wherein an alert type comprises one of an unconfirmed task whose due date is approaching, a working area workload, a resource workload, the ratio of the number of tasks per suitably qualified resource, and a non-executable task; and provide an alert on the user interface when a value of an object for which an alert has been configured has been exceeded.

18. The system of claim 14 wherein the memory further includes instructions to cause the processor to:

configure an upper control level warning for an alert type, wherein an alert type comprises one of an unconfirmed task whose due date is approaching, a working area workload, a resource workload, the ratio of the number of tasks per suitably qualified resource, and a non-executable task; and provide an alert on the user interface when a value of an object for which an alert has been configured has been exceeded.

19. The system of claim 14 wherein the memory further includes instructions to cause the processor to:

configure a lower control level for an alert type, wherein an alert type comprises one of an unconfirmed task whose due date is approaching, a working area workload, a resource workload, the ratio of the number of tasks per suitably qualified resource, and a non-executable task; and provide an alert on the user interface when a value of an object for which an alert has been configured falls below the lower control level.

20. The system of claim 14 wherein the memory further includes instructions to cause the processor to:

configure a lower control level warning for an alert type, wherein an alert type comprises one of an unconfirmed task whose due date is approaching, a working area workload, a resource workload, the ratio of the number of tasks per suitably qualified resource, and a non-executable task; and provide an alert on the user interface when a value of an object for which an alert has been configured falls below the lower control level warning.

21. The system of claim 14 wherein the memory further includes instructions to cause the processor to:

receive a user request to modify information stored in the database;

modify the information in the database, in response to the request; and update the user interface to display the modified information.

22. A system for monitoring specific areas of concern in warehouse operations comprising:
a device for monitoring specific areas of concern in warehouse operations comprising:
a processor;
a storage means for storing a database; and
a memory coupled to the processor to store instructions that, when applied to the processor, cause the processor to:
store information describing operations of a warehouse in a database;
display information on a user interface about an alert type and a category of alert types associated with that alert type, wherein a category of alert types is one of several classes of alert types;
receive a user request for information about an alert type stored in the database;
retrieve the requested information from the database, in response to the request; and
update the user interface to display the requested information.

23. The system of claim 22 wherein the memory further includes instructions to cause the processor to update the user interface to display the current information by selecting an icon.

24. The system of claim 22 wherein the memory further includes instructions to cause the processor to cause the processor to switch to a user interface for monitoring warehouse operations by selecting an icon.

25. The system of claim 22 wherein the memory further includes instructions to cause the processor to cause the processor to:
configure an upper control level for an alert type, wherein an alert type comprises one of an unconfirmed task whose due date is approaching, a working area workload, a resource workload, the ratio of the number of tasks per suitably qualified resource, and a non-executable task; and
provide an alert on the user interface when a value of an object for which an alert has been configured has been exceeded.

26. The system of claim 22 wherein the memory further includes instructions to cause the processor to cause the processor to:
configure an upper control level warning for an alert type, wherein an alert type comprises one of an unconfirmed task whose due date is approaching, a working area workload, a resource workload, the ratio of the number of tasks per suitably qualified resource, and a non-executable task; and
provide an alert on the user interface when a value of an object for which an alert has been configured has been exceeded.

27. The system of claim 22 wherein the memory further includes instructions to cause the processor to cause the processor to:
configure a lower control level for an alert type, wherein an alert type comprises one of an unconfirmed task whose due date is approaching, a working area workload, a resource workload, the ratio of the number of tasks per suitably qualified resource, and a non-executable task; and
provide an alert on the user interface when a value of an object for which an alert has been configured falls below the lower control level.

28. The system of claim 22 wherein the memory further includes instructions to cause the processor to cause the processor to:
configure a lower control level warning for an alert type, wherein an alert type comprises one of an unconfirmed task whose due date is approaching, a working area workload, a resource workload, the ratio of the number of tasks per suitably qualified resource, and a non-executable task; and
provide an alert on the user interface when a value of an object for which an alert has been configured falls below the lower control level warning.

29. The system of claim 22 wherein the memory further includes instructions to cause the processor to cause the processor to:
receive a user request to modify information stored in the database;
modify the information in the database, in response to the request; and
update the user interface to display the modified information.

30. An article comprising a computer-readable medium that stores executable instructions for causing a computer system to:
store information describing operations of a warehouse in a database;
display information on a user interface about an alert type and a category of alert types associated with that alert type, wherein a category of alert types is one of several classes of alert types;
receive a user request for information about an alert type stored in the database;
retrieve the requested information from the database, in response to the request; and
update the user interface to display the requested information.

31. The article of claim 30 further comprising instructions to cause the computer system to update the user interface to display the current information by selecting an icon.

32. The article of claim 30 further comprising instructions to cause the computer system to switch to a user interface for monitoring warehouse operations by selecting an icon.

33. The article of claim 30 further comprising instructions to cause the computer system to:
configure an upper control level for an alert type, wherein an alert type comprises one of an unconfirmed task whose due date is approaching, a working area workload, a resource workload, the ratio of the number of tasks per suitably qualified resource, and a non-executable task; and
provide an alert on the user interface when a value of an object for which an alert has been configured has been exceeded.

34. The article of claim 30 further comprising instructions to cause the computer system to:
configure an upper control level for an alert type, wherein an alert type comprises one of an unconfirmed task whose due date is approaching, a working area workload, a resource workload, the ratio of the number of tasks per suitably qualified resource, and a non-executable task; and
provide an alert on the user interface when a value of an object for which an alert has been configured has been exceeded.

35. The article of claim 30 further comprising instructions to cause the computer system to:

configure an upper control level warning for an alert type, wherein an alert type comprises one of an unconfirmed task whose due date is approaching, a working area workload, a resource workload, the ratio of the number of tasks per suitably qualified resource, and a non-executable task; and provide an alert on the user interface when a value of an object for which an alert has been configured has been exceeded.

36. The article of claim 30 further comprising instructions to cause the computer system to:

configure a lower control level for an alert type, wherein an alert type comprises one of an unconfirmed task whose due date is approaching, a working area workload, a resource workload, the ratio of the number of tasks per suitably qualified resource, and a non-executable task; and provide an alert on the user interface when a value of an object for which an alert has been configured falls below the lower control level.

37. The article of claim 30 further comprising instructions to cause the computer system to:

configure a lower control level warning for an alert type, wherein an alert type comprises one of an unconfirmed task whose due date is approaching, a working area workload, a resource workload, the ratio of the number of tasks per suitably qualified resource, and a non-executable task; and provide an alert on the user interface when a value of an object for which an alert has been configured falls below the lower control level warning.

38. The article of claim 30 further comprising instructions to cause the computer system to:

receive a user request to modify information stored in the database;

modify the information in the database, in response to the request; and update the user interface to display the modified information.

\* \* \* \* \*